US008545713B2

(12) United States Patent
Iwai et al.

(10) Patent No.: US 8,545,713 B2
(45) Date of Patent: Oct. 1, 2013

(54) BLACK MAGNETIC IRON OXIDE PARTICLES

(75) Inventors: Ryo Iwai, Hiroshima-ken (JP); Mamoru Kamigaki, Hiroshima-ken (JP); Nobuya Shimo, Hiroshima-ken (JP); Naoki Uchida, Hiroshima-ken (JP)

(73) Assignee: Toda Kogyo Corporation, Otake-shi, Hiroshima-ken (JP)

(*) Notice: Subject to any disclaimer, the term of this patent is extended or adjusted under 35 U.S.C. 154(b) by 79 days.

(21) Appl. No.: 13/262,105

(22) PCT Filed: Mar. 30, 2010

(86) PCT No.: PCT/JP2010/055714
§ 371 (c)(1),
(2), (4) Date: Nov. 21, 2011

(87) PCT Pub. No.: WO2010/113954
PCT Pub. Date: Oct. 7, 2010

(65) Prior Publication Data
US 2012/0064449 A1    Mar. 15, 2012

(30) Foreign Application Priority Data
Mar. 31, 2009   (JP) ................................ 2009-088150

(51) Int. Cl.
C01G 49/08 (2006.01)
H01F 1/34 (2006.01)
H01F 1/36 (2006.01)
G03G 9/083 (2006.01)
G03G 9/087 (2006.01)

(52) U.S. Cl.
USPC ..................... 252/62.56; 430/106.1; 423/623; 106/456; 252/62.59; 252/62.58; 252/62.6; 252/62.62; 252/62.63; 252/62.64

(58) Field of Classification Search
USPC .......... 252/62.56, 62.59, 62.64, 62.63, 62.62, 252/62.6, 62.58; 106/456; 423/623, 594.1; 430/106.1
See application file for complete search history.

(56) References Cited

U.S. PATENT DOCUMENTS
5,858,532 A * 1/1999 Kozawa et al. ............... 428/402
6,780,555 B2   8/2004 Uchida et al.

FOREIGN PATENT DOCUMENTS
JP   2000-344527   * 12/2000
JP   2006-193364     7/2006

OTHER PUBLICATIONS
English version of the International Preliminary Report on Patentability in PCT/JP2010/055714 mailed Nov. 24, 2011.
International Search Report for PCT/JP2010/055714, mailed Mar. 30, 2010.

* cited by examiner

Primary Examiner — Carol M Koslow
(74) Attorney, Agent, or Firm — Nixon & Vanderhye P.C.

(57) ABSTRACT

The present invention relates to black magnetic iron oxide particles comprising magnetite as a main component, wherein when the black magnetic iron oxide particles are molded into a tablet shape, an electric resistance value of the tablet in an alternating current electric field is controlled to produce an impedance of not less than $2 \times 10^6$ Ωcm as measured in a characteristic frequency range thereof. The black magnetic iron oxide particles according to the present invention can provide a toner capable of exhibiting a good charging performance and a uniform charging property under the high-temperature and high-humidity conditions, so that when developing an electrostatic latent image therewith, it is possible to obtain toner images having a high resolution or definition, and further the use of heavy metal elements in the black magnetic iron oxide particles can be minimized.

12 Claims, 4 Drawing Sheets

BLACK MAGNETIC IRON OXIDE PARTICLES

This application is the U.S. national phase of International Application No. PCT/JP2010/055714, filed 30 Mar. 2010, which designated the U.S. and claims priority to Japan Application No. 2009-088150, filed 31 Mar. 2009, the entire contents of each of which are hereby incorporated by reference.

TECHNICAL FIELD

The present invention relates to black magnetic iron oxide particles having a high impedance. In particular, when the black magnetic iron oxide particles of the present invention are used as a pigment in toner particles, the resulting toner can exhibit a good charging property and a good charge retention property owing to a high impedance thereof and can be improved in charging performance, in the process of controlling behavior of the toner particles in an alternating current electric field, and further the obtained toner can exhibit a high image density retention property.

BACKGROUND ART

As one of electrostatic latent image developing methods, the developing method using, as a developer, composite particles produced by mixing and dispersing magnetic particles such as magnetite particles in a binder resin without using any carrier, i.e., a so-called "one-component magnetic toner" is extensively known and has been generally put into practice.

Recently, with the global spread and development of electrostatic copying machines and printing machines, it has been strongly required to improve properties of magnetic toners as a developer for these apparatuses, i.e., there is a strong demand for magnetic toners which are excellent in environmental stability so as to exhibit a stable developing performance even under any environmental conditions including high-temperature and high-humidity conditions and low-temperature and low-humidity conditions.

The magnetic toner mainly comprises magnetic particles and a binder resin, and the magnetic particles are uniformly dispersed in the toner particles. The electric field environmental conditions within the apparatuses when using such a toner are widely varied between respective makers of toners and developing devices for copying machines, printing machines, composite machines, etc. In the magnetic one-component developing system, black magnetic particles are mainly used as a pigment component for the developer. In this category, within the developing devices, it is most important that toner particles are allowed to exactly transfer from a toner thin layer formed on a developing sleeve charged in the range of from about hundred gausses to several thousands of gausses, to an electrostatic latent image portion as an electrostatically printed site finely formed on a photosensitive member, by controlling behavior of the toner particles. With such a measure, it is possible to obtain good toner images which are excellent in so-called thin-line reproducibility and gradation without any developing deficiencies such as fogging, insufficient image intensity, lack of images and uneven image intensity.

When the toner particles (or masses of the toner particles) are transferred from the developing sleeve to the surface of the photosensitive member, two forces, i.e., a magnetic force (acting between a pigment in the developer particles and a magnetic pole of the sleeve) and an electrostatic attraction force (acting between a surface of the respective developer particles charged by friction electrification and an electrostatic latent image formed on the surface of a photosensitive drum) are exerted on the toner particles.

More specifically, in order to well control behavior of the toner particles, in the process from frictional electrification of the toner particles through desorption of the toner particles from a surface of the sleeve up to adhesion of the toner particles to the surface of the electrostatic latent image portion on the photosensitive member, the procedure of controlling the behavior of the toner particles must be carried out while keeping a good balance between an electrostatic amount (charge amount) and a magnetic force of the toner particles.

First, as the premise for well controlling the behavior of the toner particles, it is desirable that a surface potential (charge amount) and the magnetic force of the individual toner particles are kept uniform.

In view of the uniform magnetic force, it is important that the magnetic material is incorporated in a uniform amount in the individual toner particles. Simultaneously, it is desired that the magnetic material is uniformly dispersed in the toner particles and is hardly desorbed from the surface of the respective toner particles.

On the other hand, in view of the uniform charge amount, it is desired that the toner particles are instantaneously uniformly charged by frictional electrification up to a desirable surface potential and maintain the charge amount.

The magnetic particles are exposed to the surface of the respective toner particles, and act as a so-called leak site through which the surface potential produced by the frictional electrification is escaped into atmospheric air, because the magnetic particles have a property of a semiconductor which is apt to flow an electric current therethrough as compared to other constituents of the toner.

Therefore, the most important task resides in that the toner is capable of maintaining a uniform charge amount on a surface thereof even under high-temperature and high-humidity conditions, and there is a strong demand for a magnetic material having a high electrical resistance value so as not to exhibit such a condition in which the toner acts as a leak site owing to exposure of the magnetic material to the surface of the toner and thereby fails to maintain a uniform charge amount.

As described above, when the toner particles are transferred from the developing sleeve to the surface of the photosensitive member, the two forces, i.e., the magnetic force and electrostatic attraction force, are exerted on the toner particles. First, the developer particles must be desorbed in the form of masses of ultrafine particles from the surface of the sleeve where a magnetic field predominates, into a space in which the above two forces act.

At this time, as a force of propelling the desorption of the toner particles, a bias voltage is applied thereto. The bias voltage is usually in the form of a superimposed voltage of a direct current bias and an alternating current bias. In general, the bias voltage is lower than a voltage of a portion of the surface of the photosensitive drum other than the latent image-forming portion thereof.

In addition, the bias voltage is also used to control the behavior of the toner particles in the space when masses of the toner particles are desorbed from the sleeve and transferred to the electrostatic latent image-forming portion on the surface of the photosensitive member. The frequency of the bias voltage is set variously depending upon design of the machine used, and is usually about several tens of Hz to about 20 kHz.

When the frequency of the bias applied is excessively high, the toner particles hardly follow the variation of the bias.

Therefor, the frequency of the bias applied is designed so as to have a good balance with the movement of the toner particles.

In order to allow the toner particles to maintain the uniformly charged condition without leakage of the charge on the surface of the toner in the electric field, it is desired that the magnetic material exposed to the surface of the respective toner particles has a high electrical resistance value. In this regard, the consideration of a direct current resistance value only will be insufficient, and the electrical resistance value in an alternating current bias space, i.e., impedance, should also be taken into consideration.

Hitherto, there have been made various studies on oxides having a high impedance. For example, the oxides include titanium oxide and titanate compounds as typical dielectric substances. In addition, as to the magnetic materials in the form of oxides having a high impedance, studies have also be made in the fields of radio wave absorbers, high-frequency magnetic cores and soft ferrite ceramics.

Magnetite is basically a semiconductor material. It is considered that the electric conductivity of magnetite is produced based on hopping conductivity between $Fe^{2+}$ and $Fe^{3+}$.

For this reason, in order to increase the resistance value of magnetite, the present inventors have past attempted that the surface of magnetite particles is treated with a dielectric substance component; the $Fe^{2+}$ component therein is substituted with the other elements; the surface of magnetite particles is oxidized to convert $Fe^{2+}$ into $Fe^{3+}$; or the structure within magnetite particles or near the surface of the magnetite particles becomes close to that of Zn ferrite, etc.

However, when the magnetite particles are surface-treated with the fine particles, the resulting particles tend to have a large surface area, so that a moisture absorption thereof tends to be undesirably increased. Further, it has been found that when $Fe^{2+}$ is reduced or is substituted with the other elements, it is not possible to ensure a high blackness degree as an inherent feature of magnetite. In addition, the method of incorporating the heavy metal elements into the magnetite is undesirable from the environmental viewpoints.

As a result of the present inventors' earnest study, there has been developed a black magnetic material with a high blackness which comprises safe elements and has a high impedance.

PRIOR ARTS

Patent Documents

Patent Document 1: Japanese Patent Application Laid-Open (KOKAI) No. 9-241025

SUMMARY OF THE INVENTION

Problem to be Solved by the Invention

At present, it has been strongly required to provide black magnetic iron oxide particles for magnetic toners which allow toner particles obtained therefrom to have a high impedance and exhibit a uniform charging property without leakage of electric charges on a surface of the toner through the magnetic material exposed thereonto to thereby produce images with a high resolution or definition when electrostatic latent images are developed therewith. However, the black magnetic iron oxide particles for magnetic toners having such properties have not been obtained until now.

That is, the black magnetic iron oxide particles described in the above Patent Document 1 have been designed for the purpose of preventing desorption of the magnetic material from the surface of the toner, and have granular protrusions on the surface thereof. However, the black magnetic iron oxide particles exhibit a low impedance.

In consequence, an object or a technical task of the present invention is to provide black magnetic iron oxide particles for magnetic toners having a high blackness and a high impedance which are capable of producing a toner having a good charging performance and a uniform charging property under high-temperature and high-humidity conditions to thereby obtain toner images having a high resolution or definition when developing electrostatic latent images therewith, and in which heavy metal elements used therein can be minimized, as well as a process for producing the black magnetic iron oxide particles.

Means for Solving the Problem

The object or technical task of the present invention can be achieved by the following aspects.

That is, according to the present invention, there are provided black magnetic iron oxide particles comprising magnetite as a main component and having such a property that when the black magnetic iron oxide particles are molded into a tablet, an electric resistance value of the tablet in an alternating current electric field is controlled to produce an impedance of not less than $2 \times 10^6$ Ωcm as measured in a characteristic frequency range thereof (Invention 1).

Also, according to the present invention, there are provided the black magnetic iron oxide particles as described in the above Invention 1, comprising $Fe^{2+}$ in an amount of not less than 17% by weight based on a whole amount of Fe (Invention 2).

Also, according to the present invention, there are provided the black magnetic iron oxide particles as described in the above Invention 1 or 2, wherein when the black magnetic iron oxide particles are molded into a tablet having a compressed density of 2.3 to 2.9 $g/cm^3$, a characteristic frequency of the tablet as measured in an alternating current electric field is present in a frequency band of not less than 50 Hz and not more than 1500 Hz (Invention 3).

Also, according to the present invention, there are provided the black magnetic iron oxide particles as described in any one of the above Inventions 1 to 3, wherein when the black magnetic iron oxide particles are molded into a tablet having a compressed density of 2.3 to 2.9 $g/cm^3$, a reactance component of the tablet as measured at the characteristic frequency in an alternating current electric field is not less than $3 \times 10^6$ Ωcm (Invention 4).

Also, according to the present invention, there are provided the black magnetic iron oxide particles as described in any one of the above Inventions 1 to 4, wherein when the black magnetic iron oxide particles are molded into a tablet having a compressed density of 2.3 to 2.9 $g/cm^3$, a half band width (as a full width at half maximum) of a peak in a reactance curve owing to a bulk in a frequency-reactance component plotting diagram (Bode diagram) of the tablet in an alternating current electric field is not more than 3 as expressed by logarithm of frequency Hz (Invention 5).

Also, according to the present invention, there are provided the black magnetic iron oxide particles as described in any one of the above Inventions 1 to 5, wherein the black magnetic iron oxide particles have an average particle diameter of 0.05 to 0.50 μm (Invention 6).

Also, according to the present invention, there are provided the black magnetic iron oxide particles as described in any one of the above Inventions 1 to 6, wherein the black magnetic iron oxide particles comprise silicon in an amount of 0.3 to 3.0 atom % in terms of Si based on Fe (Invention 7).

Also, according to the present invention, there are provided the black magnetic iron oxide particles as described in any one of the above Inventions 1 to 7, wherein the black magnetic iron oxide particles basically have a spherical particle shape and are formed with angular protrusions on a surface thereof (Invention 8).

Also, according to the present invention, there are provided the black magnetic iron oxide particles as described in the above Invention 8, wherein the number of the protrusions formed on the surface of the respective black magnetic iron oxide particles is in the range of 2 to 30 when viewed on a projected plan thereof (Invention 9).

Also, according to the present invention, there are provided the black magnetic iron oxide particles as described in any one of the above Inventions 1 to 9, wherein the black magnetic iron oxide particles comprise at least one element selected from the group consisting of Al, Ti, Mg, Co, Zr, Mn, Zn, Ni, Cu, S, Na, P, Ca, Ce, Sr, Ba, Cr, Sn and Bi in an amount of 0 to 10.0 atom % based on Fe (Invention 10).

In addition, according to the present invention, there is provided a process for producing the black magnetic iron oxide particles as described in any one of the above Inventions 1 to 10, comprising the following two-stage reaction steps:

a first-stage reaction step of reacting a ferrous salt aqueous solution with an alkali aqueous solution comprising an alkali in an amount of 0.80 to 0.99 equivalent based on a ferrous salt in the ferrous salt aqueous solution to obtain a ferrous salt reaction aqueous solution comprising a ferrous hydroxide colloid, and then passing an oxygen-containing gas through the ferrous salt reaction aqueous solution while heating the ferrous salt reaction aqueous solution at a temperature of 70 to 100° C. to thereby produce magnetite seed crystal particles; and a second-stage reaction step of adding an alkali aqueous solution in an amount of not less than 1.00 equivalent based on residual $Fe^{2+}$ in the reaction aqueous solution obtained after completion of the first-stage reaction step, and passing an oxygen-containing gas through the resulting solution while heating the solution at a temperature of 70 to 100° C. to subject the magnetite seed crystal particles to growth reaction, wherein in the first-stage reaction step, a water-soluble silicate is added to adjust a pH value of the reaction aqueous solution therein to 7.0 to 8.5, and before initiation of the second-stage reaction step, a ferrous salt solution is added in an amount of 1.0 to 30.0 atom % based on Fe used in the first-stage reaction step (Invention 11).

Further, according to the present invention, there is provided a magnetic toner comprising 100 parts by weight of a binder and 20 to 150 parts by weight of the black magnetic iron oxide particles as described in any one of the above Inventions 1 to 10 (Invention 12).

Effect of the Invention

The black magnetic iron oxide particles according to the present invention is capable of producing a toner exhibiting a good charging property and a good charge retention property owing to a high impedance thereof. Thus, the resulting toner can be improved in charging performance and can exhibit a high image density retention property.

Figure 1:
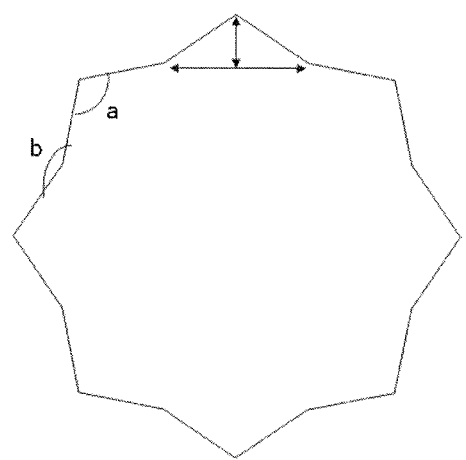
FIG. 1 is a conceptual explanatory view schematically showing an enlarged configuration of black magnetic iron oxide particles according to the present invention.

EXPLANATION OF REFERENCE NUMERALS (a): Angle between extension lines of both sides of a protrusion at an intersection point thereof; (b): Angle between opposite ends and side of the protrusion.

PREFERRED EMBODIMENTS FOR CARRYING OUT THE INVENTION

The construction of the present invention is described in detail below.

First, the black magnetic iron oxide particles according to the present invention are described.

The black magnetic iron oxide particles according to the present invention comprise magnetite particles having a composition represented by the formula: $(FeO)_x \cdot Fe_2O_3$ wherein $0 < x \leq 1$.

The black magnetic iron oxide particles according to the present invention preferably have a $Fe^{2+}$ content of not less than 17% by weight based on a whole weight of the black magnetic iron oxide particles. When the $Fe^{2+}$ content is less than 17% by weight, the resulting particles tend to be tinted with a reddish color and deteriorated in blackness, and therefore tend to become less useful as a black pigment. When the $Fe^{2+}$ content is more than 25% by weight, the resulting particles exhibit a high blackness and a high magnetization value, but tend to be readily oxidized on the surface thereof and deteriorated in environmental stability. The $Fe^{2+}$ content in the black magnetic iron oxide particles is preferably 17 to 25% by weight.

When the black magnetic iron oxide particles according to the present invention are molded into a tablet shape (pellet shape) having a compressed density of 2.3 to 2.9 g/cm³, an electric resistance value of the tablet in an alternating current electric field is not less than $2 \times 10^6$ Ωcm as measured in a characteristic frequency range thereof. When the electrical resistance value of the tablet in an alternating current electric field is less than $2 \times 10^6$ Ωcm, an electric current tends to be readily flowed through the black magnetic iron oxide particles, and therefore the particles tend to suffer from leakage of electric charges therefrom, resulting in deteriorated charging performance of the toner under high-temperature and high-humidity conditions. The electrical resistance value of the tablet formed of the black magnetic iron oxide particles in an alternating current electric field is preferably not less than $4 \times 10^6$ Ωcm and more preferably $5 \times 10^6$ to $7 \times 10^8$ Ωcm. When the electrical resistance value of the tablet in an alternating current electric field is more than $7 \times 10^8$ Ωcm, although the resulting toner tends to be improved in charging performance, fogging problems tend to be caused depending upon kinds of developing devices used, so that aside from the above problems to be solved by the present invention, the resulting toner tends to be deteriorated in environmental stability under low-temperature and low-humidity conditions.

When the black magnetic iron oxide particles according to the present invention are molded into a tablet shape having a compressed density of 2.3 to 2.9 g/cm$^3$, a characteristic frequency of the tablet as measured in an alternating current electric field is preferably present in a frequency band of not less than 50 Hz and not more than 1500 Hz. When the characteristic frequency of the tablet as measured in an alternating current electric field is out of the above-specified range, the black magnetic iron oxide particles tend to have an excessively high dielectric property or an excessively low impedance any of which tends to be unsuitable for a black pigment for toners. The characteristic frequency of the tablet as measured in an alternating current electric field is more preferably 100 to 1300 Hz and still more preferably 100 to 1000 Hz.

When the black magnetic iron oxide particles are molded into a tablet shape having a compressed density of 2.3 to 2.9 g/cm$^3$, a reactance component of the tablet as measured at the characteristic frequency in an alternating current electric field is preferably not less than $3 \times 10^6$ Ωcm. When the reactance component of the tablet as measured at the characteristic frequency in an alternating current electric field is less than $3 \times 10^6$ Ωcm, the impedance as a vector in a Gaussian plane tends to be finally undesirably lowered. Also, the decrease in reactance owing to large collapse of a semicircle in the Nyquist plot tends to mean existence of a plurality of different conductive processes. In particular, the decrease in reactance which is caused owing to a large void percentage of strongly aggregated particles tends to have a large adverse influence on uniform dispersion of the magnetic material. The reactance component of the tablet as measured at the characteristic frequency in an alternating current electric field is more preferably not less than $4 \times 10^6$ Ωcm and still more preferably $4 \times 10^6$ to $5 \times 10^8$ Ωcm.

The black magnetic iron oxide particles according to the present invention basically have a spherical particle shape and are preferably in the form of particles formed thereon with angular protrusions. When the particle shape of the black magnetic iron oxide particles is merely a spherical shape, it is not possible to not only suppress desorption of the black magnetic iron oxide particles from the toner particles, but also retain electric charges on the surface of the toner particles owing to a low impedance thereof. When the protrusions formed on the surface of the respective particles are rounded protrusions, although the black magnetic iron oxide particles are free from desorption from the toner particles, such particles tend to exhibit a low impedance, thereby failing to retain electric charges on the toner particles. Further, since an area of the magnetic material exposed onto the surface of the toner is increased, the resulting toner tends to be further deteriorated in charging performance.

In the particles constituting the black magnetic iron oxide particles according to the present invention, the number of the convex protrusions formed on the surface thereof is in the range of 2 to 30 and preferably 4 to 20 when viewed on a projected plan thereof. If the particle shape is a conventionally well known shape such as a spherical shape, an octahedral shape, a hexahedral shape or a polyhedral shape, the particles may fail to retain electric charges thereon owing to a low impedance thereof, and tend to be desorbed and fallen off from the surface of the toner particles when exposed thereto. When the number of the protrusions is less than 2, the effect of preventing desorption of the black magnetic iron oxide particles from the surface of the toner particles tends to be lessened. When the number of the protrusions is more than 30, although contact portions of the black magnetic iron oxide particles with the resin on the surface of the toner particles are increased, each of the protrusions tends to become small in size, thereby failing to attain a sufficient effect of preventing desorption of the black magnetic iron oxide particles.

The angular protrusions as used in the present invention mean those capable of satisfying the following conditions. That is, when viewed on a projected plan (transmission electron micrograph, etc.) of the black magnetic iron oxide particles, (1) Both ends of the protrusion are of a concave shape.
(2) Convex portion (projected portion) is of an angular shape.
(3) An angle (a) between extension lines of both sides of the protrusion at an intersection point thereof and an angle (b) between both ends and a side of the protrusion are capable of satisfying the following conditions:
  i) a<90°
  ii) 90°<b<180°

The judgment with respect to the above items (1) and (2) is made by observation on the projected plan (transmission electron micrograph, etc.). The judgment whether the above item (3) is complied or not is made by measuring the angles of the respective protrusions on the surface of the black magnetic iron oxide particles observed on the projected plan (transmission electron micrograph, etc.).

Meanwhile, FIG. 1 is a conceptual explanatory view showing an enlarged configuration of the black magnetic iron oxide particles capable of satisfying the above items (1) to (3). In the item (1), the "both ends of the protrusion having a concave shape" represent portions indicated by an arrow A, whereas in the item (2), the "angular convex portions" represent portions indicated by an arrow B. In the item (3), the "angle (a) between extension lines of both sides of the protrusion at an intersection point thereof" and the "angle (b) between both ends and a side of the protrusion" are respectively represented by a and b in FIG. 1.

The black magnetic iron oxide particles according to the present invention comprise black magnetic iron oxide particles basically having a spherical shape and comprising 2 to 30 angular protrusions on the surface thereof in an amount of not less than 60% and preferably not less than 70% in terms of percent by number thereof. When the percent by number of the above-specified particles is less than 60%, the toner obtained from the black magnetic iron oxide particles tend to hardly exhibit the effect of preventing desorption of the black magnetic iron oxide particles from the surface of the toner particles. Meanwhile, the angular protrusions as used herein mean those capable of satisfying the above items (1) to (3).

The black magnetic iron oxide particles according to the present invention preferably have an average particle diameter of 0.05 to 0.50 μm. When the average particle diameter of the black magnetic iron oxide particles is less than 0.05 μm, the number of the black magnetic iron oxide particles per unit volume tends to be excessively large, and the number of contact portions between the particles tends to be increased. As a result, since the adhesion force between powder layers becomes large, the black magnetic iron oxide particles tend to be deteriorated in dispersibility when obtaining a magnetic toner therefrom. When the average particle diameter of the black magnetic iron oxide particles is more than 0.50 μm, the number of the black magnetic iron oxide particles incorporated in one toner particle tends to be small, so that the distribution of the black magnetic iron oxide particles in the respective toner particles tends to be non-uniform, resulting in deteriorated uniformity of electric charges on the toner. The average particle diameter of the black magnetic iron oxide particles is more preferably 0.10 to 0.30 μm.

The black magnetic iron oxide particles according to the present invention preferably have a BET specific surface area of 3 to 30 m$^2$/g and more preferably 5 to 20 m$^2$/g. When the BET specific surface area of the black magnetic iron oxide particles is less than 3 m$^2$/g, the average particle diameter of the resulting particles tends to exceed 0.50 μm, so that the toner particles obtained from the particles tend to be deteriorated in uniformity of charging thereof and tend to be lessened in tinting strength, thereby failing to obtain toner images having a high resolution or definition. When the BET specific surface area of the black magnetic iron oxide particles is more than 30 m$^2$/g, the resulting black magnetic iron oxide particles tend to exhibit a high moisture absorptivity and therefore a high electrical conductivity, so that the toner particles obtained therefrom tend to be deteriorated in charging performance.

The black magnetic iron oxide particles according to the present invention comprise Si in an amount of 0.3 to 3.0 atom % and preferably 0.6 to 2.7 atom % based on Fe. When the Si content is less than 0.3 atom %, the amount of Si present on the surface of the respective particles tends to be reduced, so that the black magnetic iron oxide particles tend to be deteriorated in fluidity. When the Si content is more than 3.0 atom %, the amount of silicon being present in the particles tends to be increased, and the black magnetic iron oxide particles tend to exhibit a high moisture absorptivity, so that the environmental stability of the toner obtained from the black magnetic iron oxide particles tends to be adversely affected. In addition, Si being present independently of the black magnetic iron oxide particles tends to disturb uniform charging on the particles, so that the toner obtained from the black magnetic iron oxide particles tends to be deteriorated in environmental stability.

The content of Si being present on the surface of the black magnetic iron oxide particles according to the present invention is preferably 0.05 to 1.0 atom % and more preferably 0.08 to 0.80 atom % based on Fe. When the Si content is less than 0.05 atom %, the toner obtained from the black magnetic iron oxide particles may fail to exhibit a good fluidity. When the Si content is more than 1.0 atom %, the black magnetic iron oxide particles tend to exhibit a high moisture absorptivity, so that the environmental stability of the toner obtained from the black magnetic iron oxide particles tends to be adversely affected. The content of Si on the surface of the black magnetic iron oxide particles is the value as measured by the method described in Examples.

The black magnetic iron oxide particles according to the present invention may comprise at least one element selected from the group consisting of Al, Ti, Mg, Co, Zr, Mn, Zn, Ni, Cu, S, Na, P, Ca, Ce, Sr, Ba, Cr, Sn and Bi, preferably at least one element selected from the group consisting of Al, Ti, Mg, S, Na, P, Ca, Ba and Sr, in an amount of 0 to 10.0 atom % based on Fe. The black magnetic iron oxide particles comprising the above elements can be enhanced in heat resistance.

The black magnetic iron oxide particles according to the present invention preferably have a saturation magnetization value of 80 to 92 Am$^2$/kg (80 to 92 emu/g) and more preferably 82 to 90 Am$^2$/kg (82 to 90 emu/g). The saturation magnetization value of 92 Am$^2$/kg (92 emu/g) is a theoretical value of saturation magnetization of magnetite, and therefore there is no case where the saturation magnetization of the particles exceeds this value. When the saturation magnetization value is less than 80 Am$^2$/kg (80 emu/g), the amount of Fe$^{2+}$ being present in the particles tends to be reduced, so that the resulting particles tend to be tinted with a reddish color and therefore tend to be unsuitable as black magnetic iron oxide particles for magnetic toners.

The black magnetic iron oxide particles according to the present invention have a compaction degree, as an index of fluidity, of not more than 50 and preferably not more than 45, and therefore exhibit a good fluidity.

The black magnetic iron oxide particles according to the present invention have a charge amount of 0 to –60 μC/g and preferably –2 to –50 μC/g.

Next, the process for producing the black magnetic iron oxide particles according to the present invention is described.

The black magnetic iron oxide particles according to the present invention can be produced by the process comprising the following two-stage reaction steps:

a first-stage reaction step of reacting a ferrous salt aqueous solution with an alkali aqueous solution comprising an alkali in an amount of 0.80 to 0.99 equivalent based on a ferrous salt in the ferrous salt aqueous solution to obtain a ferrous salt reaction aqueous solution comprising a ferrous hydroxide colloid, and then passing an oxygen-containing gas through the ferrous salt reaction aqueous solution while heating the ferrous salt reaction aqueous solution at a temperature of 70 to 100° C. to thereby produce magnetite seed crystal particles; and a second-stage reaction step of adding an alkali aqueous solution in an amount of not less than 1.00 equivalent based on residual Fe$^{2+}$ in the reaction aqueous solution obtained after completion of the first-stage reaction step, and passing an oxygen-containing gas through the resulting solution while heating the solution at a temperature of 70 to 100° C. to subject the magnetite seed crystal particles to growth reaction, wherein in the first-stage reaction step, a water-soluble silicate is added to adjust a pH value of the reaction aqueous solution therein to 7.0 to 8.5, and before initiation of the second-stage reaction step, a ferrous salt solution is added in an amount of 1.0 to 30.0 atom % based on Fe used in the first-stage reaction step.

Examples of the ferrous salt aqueous solution used in the first-stage reaction in the present invention include a ferrous sulfate aqueous solution and a ferrous chloride aqueous solution.

Examples of the alkali aqueous solution used in the present invention include an aqueous solution of an alkali metal hydroxide such as sodium hydroxide and potassium hydroxide, an aqueous solution of an alkali earth metal hydroxide such as magnesium hydroxide and calcium hydroxide, an aqueous solution of an alkali carbonate such as sodium carbonate, potassium carbonate and ammonium carbonate, and aqueous ammonia.

The amount of the alkali aqueous solution used in the first-stage reaction before adjusting the pH value of the reaction aqueous solution is in the range of 0.80 to 0.99 equivalent and preferably 0.90 to 0.99 equivalent based on Fe$^{2+}$ in the ferrous salt aqueous solution. When the amount of the alkali aqueous solution used in the first-stage reaction is less than 0.80 equivalent, goethite tends to be included in the reaction product so that the aimed magnetite particles tend to be hardly obtained in the form of a single phase. When the amount of the alkali aqueous solution used in the first-stage reaction is more than 0.99 equivalent, the resulting particles tend to have a wide particle size distribution, thereby failing to obtain those particles having a uniform particle diameter.

The reaction temperature used in the first-stage reaction in the present invention is 70 to 100° C. When the reaction temperature is lower than 70° C., acicular crystal goethite particles tend to be included in the reaction product. Even when the reaction temperature is higher than 100° C., magnetite particles are produced. However, such a high reaction temperature tends to be disadvantageous from the industrial viewpoints because the process requires a special apparatus such as an autoclave.

In the first-stage reaction of the present invention, the oxidation method may be conducted by passing an oxygen-containing gas (for example, air) through the solution.

Examples of the water-soluble silicate used in the first-stage reaction of the present invention include sodium silicate, potassium silicate, etc. The amount of the water-soluble silicate added is 0.3 to 3.0 atom % and preferably 0.6 to 3.0 atom % in terms of Si based on Fe. When the amount of the water-soluble silicate added is less than 0.3 atom %, the resulting particles tend to be in the form of hexahedral particles, so that the effect of preventing desorption of the particles from the surface of the resulting toner tends to be deteriorated. On the other hand, when the amount of the water-soluble silicate added is more than 3.0 atom %, acicular goethite particles tend to be included in the reaction product. In addition, since the content of silicon in the obtained particles is increased, the amount of water absorbed therein tends to be increased, so that the environmental stability of the toner obtained from the particles tends to be adversely affected. Further, Si being precipitated independently of the black magnetic iron oxide particles tends to disturb uniform charging of the toner, so that the resulting toner tends to be deteriorated in charging stability.

As to the time of addition of the water-soluble silicate in the first-stage reaction, the water-soluble silicate is added to the ferrous salt reaction aqueous solution comprising the ferrous hydroxide colloid during the first-stage reaction.

In the first-stage reaction of the present invention, the pH value of the suspension is controlled to 7.0 to 8.5 when the oxidation degree of ferrous iron $Fe^{2+}$ ($Fe^{3+}$/whole Fe) lies in the range of not less than 10%. When the pH value of the suspension is out of the above-specified range, the pH value of the suspension may be adjusted to the range of 7.0 to 8.5 by adding an acid such as sulfuric acid or an alkali such as an alkali hydroxide aqueous solution thereto. When the pH value of the suspension is less than 7.0, the resulting particles tend to have less irregularities on the surface thereof and exhibit a shape close to a sphere, so that the effect of preventing desorption of the black magnetic iron oxide particles from the surface of the toner tends to be insufficient. When the pH value of the suspension is more than 8.5, the resulting particles tend to have a hexahedral shape or an octahedral shape, so that the effect of preventing desorption of the black magnetic iron oxide particles from the surface of the toner tends to be insufficient.

The terminal point of the first-stage reaction is determined as the time at which the oxidation reaction is completed and the oxidation-reduction potential is increased.

In the second-stage reaction of the present invention, the ferrous salt solution is added in an amount of 1.0 to 30.0 atom % and preferably 5.0 to 25.0 atom % based of a whole amount of Fe used in the first-stage reaction before initiation of the second-stage reaction. When the amount of the ferrous salt solution added is less than 1.0 atom %, the obtained black magnetic iron oxide particles may fail to have angular protrusions. When the amount of the ferrous salt solution added is more than 30.0 atom %, the black magnetic iron oxide particles having an octahedral shape tend to be produced independently of the aimed black magnetic iron oxide particles, so that the effect of preventing desorption of the black magnetic iron oxide particles from the surface of the toner tends to be insufficient.

In the second-stage reaction of the present invention, the amount of the alkali aqueous solution used therein is not less than 1.00 equivalent based on $Fe^{2+}$ being present at initiation of the second-stage reaction after adding the ferrous salt solution. When the amount of the alkali aqueous solution used is less than 1.00 equivalent, it is not possible to precipitate a whole amount of the residual $Fe^{2+}$. In practice, the amount of the alkali aqueous solution used may be suitably selected from the range of not less than 1.00 equivalent in view of the industrial applications.

The reaction temperature used in the second-stage reaction of the present invention is 70 to 100° C. When the reaction temperature used in the second-stage reaction is lower than 70° C., acicular crystal goethite particles tend to be included in the reaction product. Even when the reaction temperature used in the second-stage reaction is higher than 100° C., magnetite particles are produced. However, the use of such a high temperature tends to require a special apparatus such as an autoclave, resulting in industrially disadvantageous process.

The reaction temperature used in the second-stage reaction may be determined by taking into account the conditions similar to those used in the first-stage reaction. In addition, the oxidation method used in the second-stage reaction may also be determined by taking into account the conditions similar to those used in the first-stage reaction.

In the first-stage reaction and the second-stage reaction of the present invention, at least one element selected from the group consisting of Al, Ti, Mg, S, Na, P, Ca, Ba and Sr may be added in an amount of 0 to 10.0 atom % based on Fe.

Meanwhile, at the time between addition of the raw materials and initiation of the first-stage reaction and at the time between completion of the first-stage reaction and initiation of the second-stage reaction, the reaction system may be fully stirred for a necessary time period, if required.

Next, the magnetic toner according to the present invention is described.

The magnetic toner according to the present invention have a mean volume diameter of 3 to 20 μm and preferably 5 to 15 μm.

The magnetic toner according to the present invention comprises the above black magnetic iron oxide particles for magnetic toners and a binder resin. The magnetic toner may further comprise a release agent, a colorant, a charge controlling agent and the other additives, if required. The proportion between the black magnetic iron oxide particles for magnetic toners and the binder resin may be controlled such that the black magnetic iron oxide particles for magnetic toners are used in an amount of 20 to 150 parts by weight and preferably 30 to 120 parts by weight based on 100 parts by weight of the binder resin.

The magnetic toner according to the present invention is substantially free from desorption of the black magnetic iron oxide particles from the surface of the toner.

The magnetic toner according to the present invention is capable of producing toner images having a high resolution or definition owing to a good fluidity thereof.

As the binder resin for the magnetic toner, there may be used vinyl-based polymers obtained by polymerizing or copolymerizing a vinyl-based monomer such as styrene, acrylic acid alkyl esters and methacrylic acid alkyl esters. Examples of the styrene monomer constituting the binder resin include styrenes and derivatives thereof such as styrene, α-methyl styrene and p-chlorostyrene. Examples of the acrylic acid alkyl esters include acrylic acid, methyl acrylate, ethyl acrylate, butyl acrylate, dodecyl acrylate, octyl acrylate, isobutyl acrylate and hexyl acrylate. Examples of the methacrylic acid alkyl esters include double bond-containing monocarboxylic acids and substituted products thereof such as methyl methacrylate, ethyl methacrylate, butyl methacrylate, isobutyl methacrylate, dodecyl methacrylate and hexyl methacrylate. The copolymers preferably comprise the styrene-based component in an amount of 50 to 95% by weight.

The copolymers may be produced by known polymerization methods such as bulk polymerization, solution polymerization, suspension polymerization and emulsion polymerization. In addition, the binder resin may also comprise, in addition to the above components, known polymers or copolymers such as polyester-based resins, epoxy-based resins and polyurethane-based resins, if required.

Upon producing the magnetic toner, the black magnetic iron oxide particles according to the present invention are used in an amount of 20 to 150 parts by weight and preferably 30 to 120 parts by weight based on 100 parts by weight of the binder resin.

As the release agent, there are preferably used paraffins having 8 or more carbon atoms, polyolefins, etc. Examples of the release agent include polyethylene, polypropylene, paraffin waxes, paraffin latexes, microcrystalline waxes and carnauba waxes. The amount of these polyolefins compounded is generally preferably in the range of 1 to 10% by weight.

As the colorant, there may be used optional adequate pigments or dyes, if required. Examples of the colorant include carbon black, chrome yellow, aniline blue, phthalocyanine blue, ultramarine blue, quinacridone, benzidine yellow or the like.

As the charge controlling agent, there may be used fluorine-based surfactants, azo-based metal complex salts, salicylic acid chromium complexes, dialkyl salicylates, naphthoic acid metal complex salts, azo-based dyes such as nigrosine, quaternary ammonium salts and carbon blacks.

Examples of the other additives include abrasives such as tin oxide, strontium titanate, barium titanate and tungsten carbide, as well as resin fine particles or inorganic fine particles which serve as a charging assistant, a conductivity-imparting agent, an anti-caking agent, a fluidity-imparting agent or the like.

As the method for producing the magnetic toner, there may be used known methods using mixing, kneading and pulverizing procedures. More specifically, the black magnetic iron oxide particles for magnetic toners and the binder resin, if required, together with the colorant, the release agent, the charge controlling agent and the other additives, are fully mixed using a mixer, and the resin and the like are then melted and kneaded in a heating kneader to compatibilize these components and thereby uniformly disperse the black magnetic iron oxide particles therein. After cooled and solidified, the resulting resin kneaded material is subjected to pulverization and classification to obtain the magnetic toner as aimed.

As the mixer, there may be used mixing devices such as a Henschel mixer and a ball mill. As the heating kneader, there may be used various heating kneaders such as a roll mill, a kneader, a twin-screw kneader and an extruder. The pulverization may be carried out using a pulverizer such as a cutter mill and a jet mill. The classification may also be carried out by known methods.

As an alternative method for producing the magnetic toner according to the present invention, there may be used a suspension polymerization method or an emulsion polymerization method. In the suspension polymerization method, a polymerizable monomer, the black magnetic iron oxide particles for magnetic toners, and the colorant, if required, together with a polymerization initiator, a crosslinking agent, the charge controlling agent and the other additives, are dissolved or dispersed to prepare a monomer composition, and then the obtained monomer composition is added to a water phase comprising a suspension stabilizer while stirring to subject the composition to granulation and polymerization, thereby forming toner particles.

In the emulsion polymerization method, an emulsifier is added during the step in which the monomer, the black magnetic iron oxide particles for magnetic toners, the colorant, the polymerization initiator, etc., are dispersed and polymerized in the water phase, thereby forming toner particles having an adequate particle diameter.

<Function>

Conventionally, the attempt of solving the problem that electric charges are leaked from the magnetic particles included in the toner particles, in particular, exposed to the surface thereof, has been made only from the viewpoint of a direct current resistance value thereof. However, the present inventors have considered that in fact, an alternating current electric field having a high voltage and a high frequency is applied to the space extending until the toner reaches a latent image portion on a photosensitive member, and therefore in order to maintain electric charges on the surface of the toner particles and strictly control behavior of the toner particles in the space, it is not sufficient to control only the direct current resistance component. Thus, as a result of the present inventors' earnest study on the method of enhancing a resistance value of the black magnetic particles in the alternating current electric field, i.e., an impedance thereof, the present invention has been attained.

The reason why the impedance is increased by the method of the present invention is considered as follows although not clearly determined. That is, it is considered that by conducting the oxidation reaction of the iron hydroxide colloid while strictly controlling the pH of the reaction system to the range where the Si component is readily grown into $SiO_2$ crystal particles in the aqueous solution, the Si component can be incorporated into a grain boundary of the magnetite core particles during a growth process thereof to form fine crystal particles having a crystal structure close to that of $SiO_2$ and thereby further expand the grain boundary, so that an electric conduction in the magnetite is inhibited, resulting in increased impedance thereof. In addition, it is considered that by conducting particle growth of magnetite having a high crystallizability in the second-stage reaction, the resulting magnetite particles can ensure a stable strength.

Another effect of the present invention is considered to reside in the following point. That is, in order to prevent occurrence of non-uniform charging owing to desorption of the magnetic particles exposed to the surface of the toner, the magnetic particles have been conventionally subjected to surface treatments to obtain strong bond between the surface of the magnetic particles and the resin. However, the present inventors have considered that from the viewpoint of bonding between the surface of the magnetic particles and the resin, it is effective to increase the contact area therebetween in order to prevent desorption of the magnetic particles from the surface of the toner, and it is effective to reduce a surface area of the magnetic particles exposed to the surface of the toner particles in order to enhance a charging performance of the toner. Under these considerations, as a result of the present inventors' earnest study on the method of obtaining the magnetic particles having irregularities on the surface thereof in which the protrusions have an angular shape, the present invention has been attained.

In the process for producing the magnetite particles according to the present invention which comprises the two-stage reactions, in the first-stage reaction, the water-soluble silicate aqueous solution is added in an amount of 0.3 to 3.0 atom % in terms of Si based on Fe, and the pH of the reaction system is adjusted to the range of 7.0 to 8.5 when the oxidation degree of $Fe^{2+}$ ($Fe^{2+}$/whole Fe) in the first-stage reaction lies within the range of not less than 10%, whereas in the second-stage reaction, the ferrous salt solution is added in an amount of 1.0 to 30.0 atom % based on Fe used in the first-stage reaction, whereby it is possible to obtain black magnetic iron oxide particles basically having a spherical shape with angular protrusions. The toner obtained by using the thus produced black magnetic iron oxide particles is free from desorption of the black magnetic iron oxide particles from the surface of the toner and therefore has an excellent durability. Also, the toner has a reduced surface area of the magnetic material exposed to the surface of the toner particles, a good fluidity and a uniform charging property, so that when developing an electrostatic latent image with the toner, it is possible to obtain toner images having a high resolution or definition.

EXAMPLES

The present invention is described in more detail by the following typical Examples. Meanwhile, the following Examples are not intended to limit the prevent invention thereto.

The impedance of the black magnetic iron oxide particles was determined as follows. That is, using a chemical impedance analyzer "3532-80" manufactured by Hioki E.E. Corp., the black magnetic iron oxide particles were measured for an impedance |Z| and a phase angle θ thereof in the measuring frequency range of 4 Hz to 1 MHz. From the thus measured values, a real number portion and an imaginary number portion of the alternating current resistance value were respectively calculated. The Bode diagram (frequency f-X) and the Nyquist plot (Rs-X) were prepared from the thus calculated values. From the peaks in the Bode diagram, the characteristic frequency, the half band width thereof, and the reactance at the characteristic frequency, were respectively calculated, and from the Nyquist plot (Rs-X), the impedance at the reactance was calculated.

The sample to be measured was prepared as follows. That is, 0.75 g of the black magnetic iron oxide particles were press-molded into a disk-shaped tablet having a diameter of 13 mm by applying a pressure of 6 MPa thereto using a tableting machine equipped with metallic jigs between which the particles were pressed from upper and lower sides and a hard-plastic outer tube. At this time, the resulting tablet had a compressed density of 2.3 to 2.9 g/cm$^3$. After releasing the applied pressure, electrode probes inputted to a measuring device were connected to the metallic jigs while contacting the tablet with the metallic jigs, and the measurement was conducted while varying the measuring frequency. In consequence, strictly speaking, about 400 g as a weight of the upper metallic jig (electrode) was further loaded on the tablet.

The zero point connection of the impedance was conducted by an open correction under the condition in which the electrodes were disconnected, and a short correction under the condition in which the electrodes were connected to the metallic jigs, i.e., under the short-circuit condition. The voltage applied to the sample during the measurement was 4V.

When the pressure applied upon the above press-molding was less than 6 MPa, it was not possible to attain the measured values having a good reproducibility since the resulting tablet had an excessively low compressed density and therefore a high void percentage. When the applied pressure was excessively high, the contact portion of the tablet with the electrodes suffered from occurrence of cracks, so that the frequency response became non-continuous, thereby failing to attain a good measuring accuracy.

The thus obtained Nyquist plots were of a semicircular shape. Therefore, as an equivalent circuit thereof, a parallel circuit comprising the resistance component and the capacity component was considered. Further, in the direct current portion in a low-frequency range, there was observed a semicircular distortion which suggests existence of another semicircle. For this reason, in accordance with a general rule, it was considered that the semicircle on the high-frequency side was the impedance due to the bulk, whereas the semicircle on the low-frequency side was the impedance at a contact interface between the particles. Therefore, the bulk characteristic frequency was determined from the semicircle on the high-frequency side in the Bode diagram.

The average particle diameter of the black magnetic iron oxide particles was determined as an average value of diameters of the particles as measured on an electron micrograph thereof. Also, the specific surface area of the particles was expressed by the value as measured by BET method.

The magnetic properties of the particles were measured using a vibration sample-type magnetometer "VSM-3S-15" manufactured by Toei Kogyo Co., Ltd., by applying an external magnetic field of up to 796 kA/m (10 kOe) thereto.

The particle shape of the black magnetic iron oxide particles was observed using a scanning electron microscope "Hitachi S-800". In addition, with respect to the protrusions being present on the surface of the black magnetic iron oxide particles, those protrusions capable of satisfying the above conditions were recognized as convex protrusions.

Whether or not the particles to be measured were the black magnetic iron oxide particles according to the present invention was judged by examining whether or not from 2 to 30 convex protrusions capable of satisfying the above conditions (1) to (3) were present on the surface of the respective particles when viewed in a projected plan thereof.

The content of Si in the black magnetic iron oxide particles was expressed by the value measured using a "Fluorescent X-ray Analyzer 3063M Model" manufactured by Rigaku Denki Kogyo Co., Ltd., according to "General Rule of Fluorescent X-ray Analysis" described in JIS K0119.

The amount of Si being present on the surface of the black magnetic iron oxide particles was measured by the following method.

That is, the black magnetic iron oxide particles and ion-exchanged water were mixed and then dispersed to prepare a suspension, and the resulting suspension was mixed with an alkali hydroxide aqueous solution and stirred for 30 min or longer, and then subjected to filtration and drying to measure a content of Si in the black magnetic iron oxide particles. The amount of Si being present on the surface of the black magnetic iron oxide particles was determined from the difference between the total content of Si before treated with the alkali and the above measured Si content.

The $Fe^{2+}$ content was expressed by the value measured by the following chemical analyzing method. That is, in an inert gas atmosphere, 25 cc of a mixed solution comprising phosphoric acid and sulfuric acid at a mixing ratio of 2:1 were added to 0.5 g of the black magnetic iron oxide particles to dissolve the black magnetic iron oxide particles therein. Several droplets of diphenylamine-sulfonic acid as an indicator were added to a dilute solution of the resulting aqueous solution, and then the obtained solution was subjected to oxidation-reduction titration using an aqueous solution of potassium bichromate. The time at which the dilute solution was tinted with violet color was determined as the terminal point of the titration, and the $Fe^{2+}$ content was calculated from the amount of the aqueous solution of potassium bichromate used until reaching the terminal point.

The charge amount of the black magnetic iron oxide particles was measured using a blow-off charge amount measuring apparatus "TB-200" manufactured by Toshiba Chemical Corp., and the charge amount of the magnetic carrier was measured by adjusting the concentration of the black magnetic iron oxide particles therein to 5% and setting the mixing time to 30 min, using "TFV-200/300" manufactured by Powdertech Co., Ltd.

The compressed density of the black magnetic iron oxide particles was determined as follows. That is, a bulk density ($\rho a$) and a tap density ($\rho t$) of the black magnetic iron oxide particles were respectively measured, and the compressed density value was calculated from these measured values by substituting the values for those in the following formula. The results were evaluated according to the following three ratings.

$$\text{Compressed Density}=[(\rho t-\rho a)/\rho t]\times 100$$

Meanwhile, the smaller the compressed density, the more excellent the fluidity of the particles.

○: Compressed density of less than 45;
Δ: Compressed density of not less than 45 and less than 65; and
×: Compressed density of not less than 65.

Meanwhile, the bulk density ($\rho a$) was measured by the pigment testing method according to JIS K 5101. Whereas, the tap density ($\rho t$) was measured as follows. That is, 10 g of the black magnetic iron oxide particles were slowly filled in 20 cc measuring cylinder through a funnel, and then allowed to drop by gravity from the height of 25 mm. The dropping operation was repeated 600 times, and the amount (volume: cc) of the black magnetic iron oxide particles filled was read out from a scale of the measuring cylinder. The tap density of the black magnetic iron oxide particles was calculated from the thus measured value by substituting the volume value for that in the following formula.

$$\text{Tap Density (g/cc)}=10 \text{ (g)/volume (cc)}$$

The rise-up time of charge amount of the black magnetic iron oxide particles was measured using a blow-off charge amount measuring apparatus "TB-200" manufactured by Toshiba Chemical Corp. Whereas, the rise-up time of charge amount of the magnetic carrier was determined by adjusting the concentration of the resin kneaded material therein to 5% and setting the mixing time to 30 min to measure the time required until being stabilized, using "TFV-200/300" manufactured by Powdertech Co., Ltd. The results were evaluated according to the following three ratings.

○: Stabilized after 10 sec;
Δ: Stabilized after 20 sec; and
×: Stabilized after 30 sec.

The desorption property of the black magnetic iron oxide particles from the surface of the toner particles was evaluated by the following method. That is, a resin kneaded material prepared by kneading the black magnetic iron oxide particles with a styrene acrylic resin was pulverized to obtain resin kneaded material particles. The thus obtained resin kneaded material particles were shaken for 60 min using a paint shaker to observe the amount of a fine powder resulting from the black magnetic iron oxide particles using an electron microscope. The amount of the thus produced fine powder of the black magnetic iron oxide particles was compared with that of the conventional spherical magnetite particles (Comparative Example 3; particle shape: spherical shape; average particle diameter: 0.21 μm; BET specific surface area: 8.9 $m^2/g$; Si content: 1.1 atom %; saturation magnetization value: 84.7 $Am^2/kg$). The results were evaluated according to the following three ratings.

○: Substantially no fine powder of the black magnetic iron oxide particles was produced;
Δ: The amount of the fine powder of the black magnetic iron oxide particles produced was smaller than that of the conventional spherical magnetite particles; and
×: The amount of the fine powder of the black magnetic iron oxide particles produced was identical to or higher than that of the conventional spherical magnetite particles.

Example 1

25.0 L of a ferrous sulfate aqueous solution comprising 1.6 mol/L of $Fe^{2+}$ were added to 24.5 L of a 3.1N sodium hydroxide aqueous solution previously prepared in a reactor (corresponding to 0.95 equivalent based on $Fe^{2+}$) at a pH of 6.7 and a temperature of 90° C. to produce a ferrous salt suspension comprising a ferrous hydroxide colloid, and then air was passed through the resulting suspension at a rate of 80 L/min to initiate a first-stage reaction, and simultaneously 0.3 L of a water-diluted solution prepared by diluting 123.4 g of water glass #3 ($SiO_2$: 28.5% by weight; corresponding to 1.7 atom % in terms of Si based on Fe) with water was added as a silicon component to the suspension. After adding the water glass solution, the resulting mixture was continuously subjected to oxidation reaction while stirring, and then the first-stage reaction was terminated to obtain a ferrous suspension comprising magnetite core crystal particles. At this time, it was confirmed that the pH value after initiation of the oxidation reaction subsequent to the time at which the oxidation degree of $Fe^{2+}$ exceeded 10% was within the range of 7.0 to 8.5.

Then, 1.6 L of a 9N sodium hydroxide aqueous solution and 3.4 L of a ferrous sulfate aqueous solution comprising 1.6 mol/L of $Fe^{2+}$ were added to the ferrous salt suspension comprising the above magnetite core crystal particles obtained after completion of the first-stage reaction to adjust the pH value of the suspension to 9.5. Thereafter, air was passed through the suspension at 90° C. at a rate of 100 L/min for 30 min to conduct the second-stage reaction, thereby producing magnetite particles. The thus produced particles were subjected to water-washing, filtration, drying and pulverization by ordinary methods.

Figure 2:
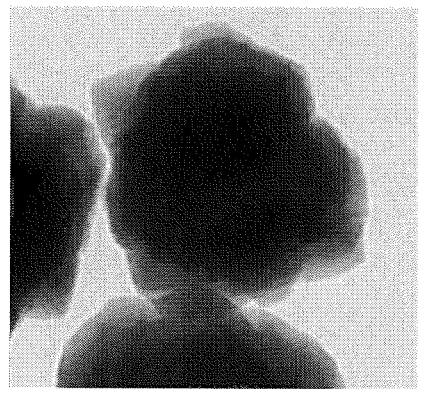
FIG. 2 is an electron micrograph (×50000) showing a particle structure of black magnetic iron oxide particles obtained in Example 1.

As apparently recognized from a transmission electron micrograph (×50000) shown in FIG. 2, the resulting magnetite particles basically had a spherical shape having angular protrusions. Further, it was confirmed that the magnetite particles had a uniform particle size, an average particle diameter of 0.21 μm and a BET specific area value of 9.2 $m^2/g$.

As a result of inspecting the convex protrusions on the surface of the particles by the above inspection methods (1) to (3), it was confirmed that the particles had angular protrusions.

In addition, as a result of fluorescent X-ray analysis, it was confirmed that the resulting magnetite particles comprised Si in an amount of 1.7 atom % based on Fe, and the amount of Si being present on the surface of the particles was 0.13 atom %. Also, as a result of oxidation-reduction titration, it was confirmed that the magnetite particles had an $Fe^{2+}$ content of 18.8% by weight and therefore exhibited a sufficient blackness degree. As to the magnetic property of the magnetite particles, the saturation magnetization value thereof was 87.3 $Am^2/kg$ (87.3 emu/g). As a result of measuring the compressed density, it was confirmed that the magnetite particles had an excellent fluidity. Further, it was confirmed that the charge amount of the magnetite particles was −10.0 μC/g.

Figure 3:
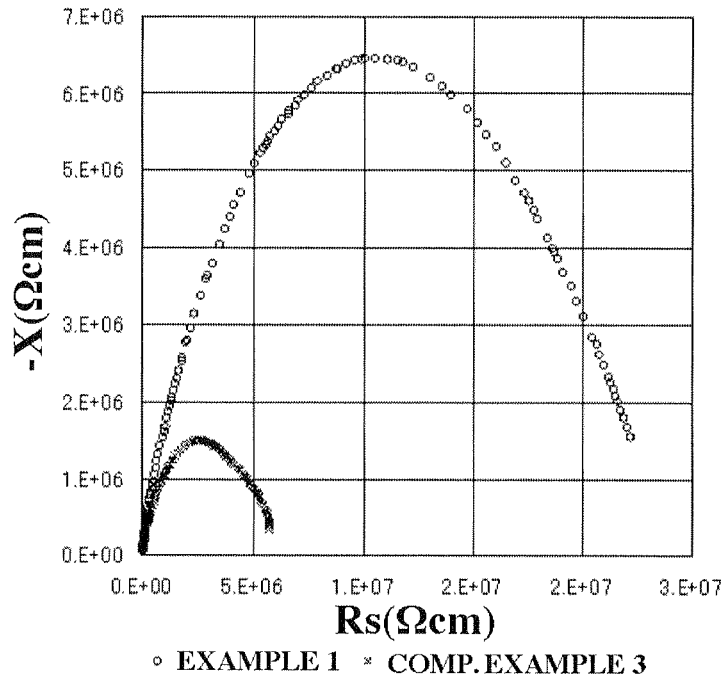
FIG. 3 is a Nyquist plot (Rs-X) of black magnetic iron oxide particles obtained in Example 1 (wherein ○ denotes plots of Example and x denotes plots of Comparative Example).
Figure 4:
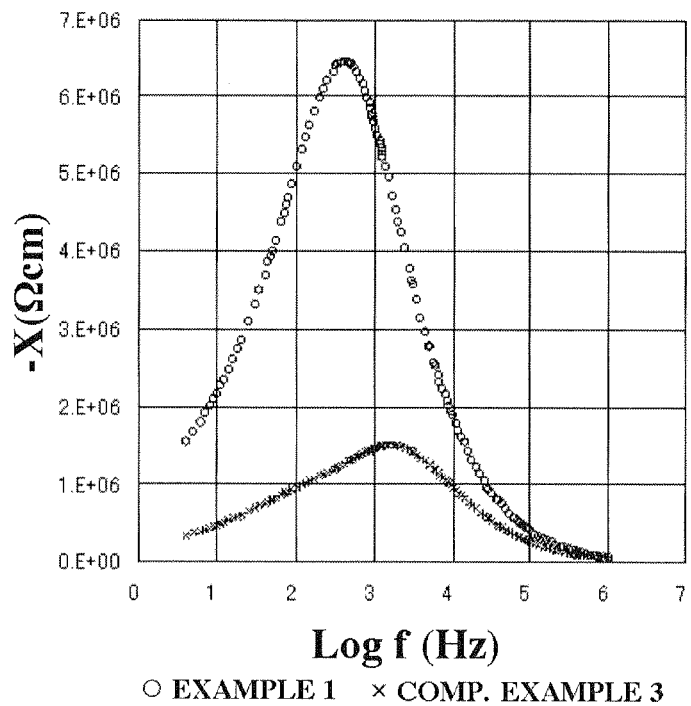
FIG. 4 is a Bode diagram (frequency f-X) of black magnetic iron oxide particles obtained in Example 1 (wherein ○ denotes plots of Example and x denotes plots of Comparative Example).
Figure 5:
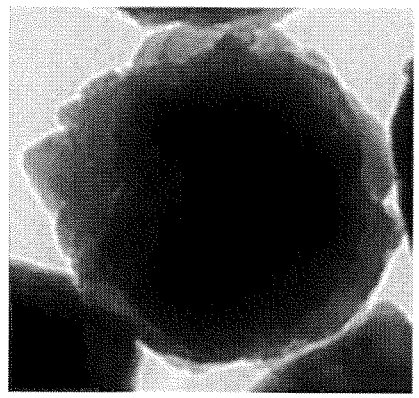
FIG. 5 is an electron micrograph (×50000) showing a particle structure of black magnetic iron oxide particles obtained in Example 2.
Figure 6:
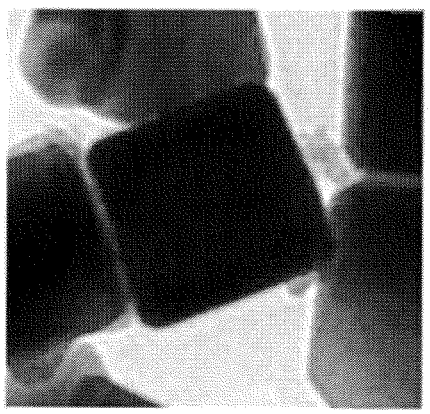
FIG. 6 is an electron micrograph (×50000) showing a particle structure of black magnetic iron oxide particles obtained in Comparative Example 1.
Figure 7:
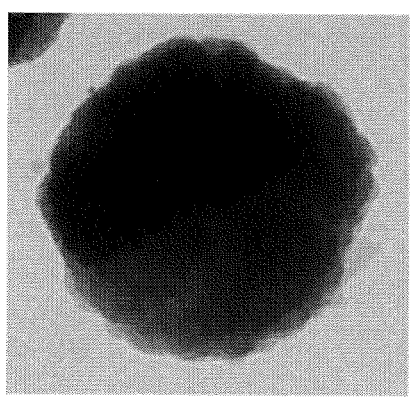
FIG. 7 is an electron micrograph (×50000) showing a particle structure of black magnetic iron oxide particles obtained in Comparative Example 3.
Figure 8:
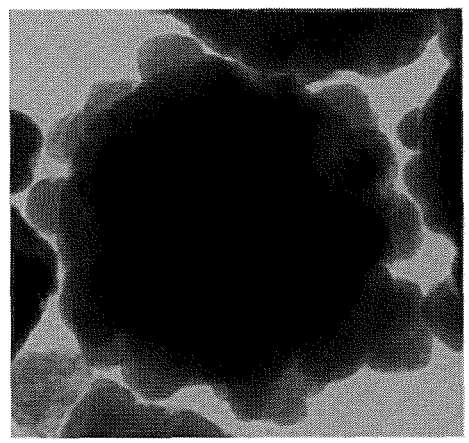
FIG. 8 is an electron micrograph (×50000) showing a particle structure of black magnetic iron oxide particles obtained in Comparative Example 5.

The measurement results of the impedance are shown in FIG. 3 (Nyquist plot) and FIG. 4 (Bode diagram).

The above produced magnetite particles and a styrene acrylic resin were kneaded together, and the resulting resin kneaded material was pulverized to prepare resin kneaded material particles. The thus obtained resin kneaded material particles were evaluated for desorption of the black magnetic iron oxide particles therefrom according to the above evaluation method. As a result, it was confirmed that a sufficient effect of preventing the desorption of the black magnetic iron oxide particles was attained.

Examples 2 to 10 and Comparative Examples 1 to 5

The same procedure as defined in Example 1 was conducted except that the kind, concentration and amount of the ferrous salt aqueous solution used in the first-stage reaction, the kind and concentration of the alkali hydroxide aqueous solution used in the first-stage reaction, the pH value adjusted in the first-stage reaction, the kind of the alkali hydroxide aqueous solution used in the second-stage reaction, the kind, concentration and amount of the ferrous sulfate aqueous solution used in the second-stage reaction, and the reaction temperature used in the second-stage reaction, were changed variously, thereby obtaining black magnetic iron oxide particles. The production conditions used above are shown in Table 1, and various properties of the thus obtained black magnetic iron oxide particles are shown in Table 2.

TABLE 1

| Examples and Comp. Examples | Production conditions of magnetic iron oxide particles First-stage reaction | | |
|---|---|---|---|
| | Ferrous salt solution | Alkali hydroxide | Equivalent ratio (2OH/Fe) |
| Example 1 | Ferrous sulfate | Sodium hydroxide | 0.95 |
| Example 2 | Ferrous sulfate | Sodium hydroxide | 0.95 |
| Example 3 | Ferrous sulfate | Sodium hydroxide | 0.90 |
| Example 4 | Ferrous sulfate | Sodium hydroxide | 0.95 |
| Example 5 | Ferrous sulfate | Sodium hydroxide | 0.88 |
| Example 6 | Ferrous sulfate | Sodium hydroxide | 0.97 |
| Example 7 | Ferrous sulfate | Sodium hydroxide | 0.95 |
| Example 8 | Ferrous sulfate | Sodium hydroxide | 0.97 |
| Example 9 | Ferrous sulfate | Sodium hydroxide | 0.82 |
| Example 10 | Ferrous sulfate | Sodium hydroxide | 0.95 |
| Comp. Example 1 | Ferrous sulfate | Sodium hydroxide | 0.95 |
| Comp. Example 2 | Ferrous sulfate | Sodium hydroxide | 0.95 |
| Comp. Example 3 | Ferrous sulfate | Sodium hydroxide | 0.95 |
| Comp. Example 4 | Ferrous sulfate | Sodium hydroxide | 0.95 |
| Comp. Example 5 | Ferrous sulfate | Sodium hydroxide | 0.95 |

| Examples and Comp. Examples | Production conditions of magnetic iron oxide particles First-stage reaction | | | |
|---|---|---|---|---|
| | Water-soluble silicate | | pH range | Time of adjustment of pH; oxidation degree (%) | Reaction temp. (° C.) |
| | Kind | Si/Fe (atom %) | | | |
| Example 1 | Water glass #3 | 1.7 | 7.0-8.5 | After 10% | 90 |
| Example 2 | Water glass #3 | 0.8 | 7.0-8.5 | After 10% | 85 |
| Example 3 | Water glass #3 | 2.8 | 7.0-8.5 | After 10% | 90 |
| Example 4 | Water glass #3 | 1.3 | 7.0-8.5 | After 10% | 80 |
| Example 5 | Water glass #3 | 3.0 | 7.0-8.5 | After 10% | 90 |
| Example 6 | Water glass #3 | 1.7 | 7.0-8.5 | After 10% | 90 |
| Example 7 | Water glass #3 | 2.3 | 7.0-8.5 | After 10% | 95 |
| Example 8 | Water glass #3 | 1.7 | 7.0-8.5 | After 10% | 90 |
| Example 9 | Water glass #3 | 2.1 | 7.0-8.5 | After 10% | 85 |
| Example 10 | Water glass #3 | 1.3 | 7.0-8.5 | After 10% | 90 |
| Comp. Example 1 | Water glass #3 | 0.2 | 7.0-8.5 | After 10% | 90 |
| Comp. Example 2 | Water glass #3 | 4.5 | 7.0-8.5 | After 10% | 90 |
| Comp. Example 3 | Water glass #3 | 1.3 | 6.0-7.0 | After 10% | 90 |
| Comp. Example 4 | Water glass #3 | 1.7 | 9.0-11.0 | After 10% | 90 |
| Comp. Example 5 | Water glass #3 | 4.5* | 8.0-9.5 | After 30% | 90 |

| Examples and Comp. Examples | Production conditions of magnetic iron oxide particles Second-stage reaction | | | |
|---|---|---|---|---|
| | Ferrous salt solution | | Additives | |
| | Kind | $Fe^{2+}/Fe^{2+}$ in first-stage reaction (atom %) | Kind | Amount added (wt %) |
| Example 1 | Ferrous sulfate | 13.8 | — | — |
| Example 2 | Ferrous sulfate | 13.8 | — | — |
| Example 3 | Ferrous sulfate | 6.9 | — | — |
| Example 4 | Ferrous sulfate | 13.8 | — | — |
| Example 5 | Ferrous sulfate | 27.6 | — | — |
| Example 6 | Ferrous chloride | 13.8 | — | — |
| Example 7 | Ferrous sulfate | 17.3 | — | — |

TABLE 1-continued

| Examples and Comp. Examples | | | | |
|---|---|---|---|---|
| Example 8 | Ferrous sulfate | 13.8 | Aluminum sulfate | 0.20 |
| Example 9 | Ferrous chloride | 13.8 | Aluminum sulfate | 0.20 |
| Example 10 | Ferrous sulfate | 13.8 | — | — |
| Comp. Example 1 | Ferrous sulfate | 13.8 | — | — |
| Comp. Example 2 | Ferrous sulfate | 13.8 | — | — |
| Comp. Example 3 | — | — | — | — |
| Comp. Example 4 | Ferrous sulfate | 13.8 | — | — |
| Comp. Example 5 | — | — | — | — |

Production conditions of magnetic iron oxide particles — Second-stage reaction

| Examples and Comp. Examples | Alkali hydroxide | Equivalent ratio based on residual $Fe^{2+}$ (2OH/Fe) | Reaction temperature (°C.) |
|---|---|---|---|
| Example 1 | Sodium hydroxide | 1.1 | 90 |
| Example 2 | Sodium hydroxide | 1.3 | 85 |
| Example 3 | Sodium hydroxide | 1.1 | 90 |
| Example 4 | Sodium hydroxide | 1.1 | 80 |
| Example 5 | Sodium hydroxide | 1.1 | 90 |
| Example 6 | Sodium hydroxide | 1.1 | 90 |
| Example 7 | Sodium hydroxide | 1.1 | 95 |
| Example 8 | Sodium hydroxide | 1.1 | 90 |
| Example 9 | Sodium hydroxide | 1.1 | 85 |
| Example 10 | Sodium hydroxide | 1.1 | 90 |
| Comp. Example 1 | Sodium hydroxide | 1.1 | 90 |
| Comp. Example 2 | Sodium hydroxide | 1.1 | 90 |
| Comp. Example 3 | Sodium hydroxide | 1.1 | 90 |
| Comp. Example 4 | Sodium hydroxide | 1.1 | 90 |
| Comp. Example 5 | Sodium hydroxide | 1.1 | 90 |

Note
*Intermittently added in five divided parts every 10 min from initiation of reaction

TABLE 2

Properties of magnetic iron oxide particles

| Examples and Comp. Examples | Average particle diameter (μm) | BET specific surface area (m²/g) | Particle shape |
|---|---|---|---|
| Example 1 | 0.21 | 9.2 | * |
| Example 2 | 0.19 | 8.1 | * |
| Example 3 | 0.16 | 10.6 | * |
| Example 4 | 0.13 | 12.8 | * |
| Example 5 | 0.28 | 6.8 | * |
| Example 6 | 0.17 | 10.1 | * |
| Example 7 | 0.22 | 9.2 | * |
| Example 8 | 0.20 | 9.2 | * |
| Example 9 | 0.20 | 9.4 | * |
| Example 10 | 0.11 | 14.3 | * |
| Comp. Example 1 | 0.19 | 7.2 | Hexahedral shape |
| Comp. Example 2 | 0.19 | 21.2 | Spherical shape |
| Comp. Example 3 | 0.21 | 8.9 | Spherical shape |
| Comp. Example 4 | 0.22 | 7.6 | Octahedral shape |
| Comp. Example 5 | 0.19 | 11.3 | ** |

Properties of magnetic iron oxide particles

| Examples and Comp. Examples | Proportion by number of particles having 2 to 30 convex protrusions (%) | Si content Si/Fe (atom %) | Si content on surface portion Si/Fe (atom %) | $Fe^{2+}$ content (wt %) |
|---|---|---|---|---|
| Example 1 | 79 | 1.7 | 0.13 | 18.8 |
| Example 2 | 69 | 0.8 | 0.03 | 18.9 |
| Example 3 | 72 | 2.7 | 1.20 | 18.8 |
| Example 4 | 75 | 1.2 | 0.08 | 17.8 |
| Example 5 | 65 | 2.8 | 0.71 | 19.2 |
| Example 6 | 77 | 0.7 | 0.11 | 18.2 |
| Example 7 | 81 | 2.0 | 0.27 | 17.1 |
| Example 8 | 80 | 1.7 | 0.10 | 17.8 |
| Example 9 | 66 | 2.0 | 0.09 | 18.2 |
| Example 10 | 62 | 1.3 | 0.05 | 17.1 |
| Comp. Example 1 | 0 | 0.2 | 0.01 | 19.2 |
| Comp. Example 2 | 0 | 3.2 | 1.04 | 17.4 |
| Comp. Example 3 | 0 | 1.1 | 0.10 | 17.4 |
| Comp. Example 4 | 0 | 1.6 | 0.05 | 18.1 |
| Comp. Example 5 | 81 | 3.7 | 0.21 | 18.2 |

Properties of magnetic iron oxide particles

| Examples and Comp. Examples | Saturation magnetization (Am²/kg) | Characteristic frequency (Hz) | Impedance at characteristic frequency (Ωcm) | Reactance at characteristic frequency (Ωcm) |
|---|---|---|---|---|
| Example 1 | 87.3 | 410 | 1.2E+07 | 6.5E+06 |
| Example 2 | 87.6 | 150 | 2.6E+07 | 1.3E+07 |
| Example 3 | 87.3 | 400 | 1.5E+07 | 1.0E+07 |
| Example 4 | 86.5 | 500 | 1.3E+07 | 8.0E+06 |
| Example 5 | 88.1 | 980 | 5.0E+06 | 1.4E+07 |
| Example 6 | 87.1 | 380 | 3.0E+07 | 7.0E+06 |
| Example 7 | 85.5 | 400 | 1.5E+07 | 6.0E+06 |
| Example 8 | 87.3 | 200 | 5.0E+07 | 3.4E+07 |
| Example 9 | 87.7 | 170 | 5.0E+07 | 4.0E+07 |
| Example 10 | 87.5 | 700 | 4.0E+06 | 4.0E+06 |
| Comp. Example 1 | 87.7 | 7000 | 8.0E+05 | 5.3E+05 |
| Comp. Example 2 | 85.3 | 1100 | 7.0E+05 | 2.0E+06 |
| Comp. Example 3 | 84.7 | 1500 | 1.0E+06 | 1.4E+06 |
| Comp. Example 4 | 83.5 | 3000 | 3.0E+05 | 1.1E+06 |
| Comp. Example 5 | 88.0 | 850 | 8.0E+05 | 1.0E+06 |

| | Properties of magnetic iron oxide particles | | Properties of resin kneaded material | |
|---|---|---|---|---|
| Examples and Comp. Examples | Half-band width of peak in Bode diagram (log Hz) | Compressed density (fluidity) | Charge amount (rise-up) | Desorption (amount of fine powder) |
| Example 1 | 2.0 | ○ | ○ | ○ |
| Example 2 | 2.3 | ○ | ○ | ○ |
| Example 3 | 2.1 | ○ | ○ | ○ |

TABLE 2-continued

| | | | | |
|---|---|---|---|---|
| Example 4 | 1.9 | ○ | ○ | ○ |
| Example 5 | 2.3 | ○ | ○ | ○ |
| Example 6 | 2.1 | ○ | ○ | ○ |
| Example 7 | 2.1 | ○ | ○ | ○ |
| Example 8 | 2.0 | ○ | ○ | ○ |
| Example 9 | 2.4 | ○ | ○ | ○ |
| Example 10 | 2.8 | ○ | ○ | ○ |
| Comp. Example 1 | 2.0 | X | X | Δ |
| Comp. Example 2 | 2.6 | Δ | X | X |
| Comp. Example 3 | 2.2 | ○ | X | X |
| Comp. Example 4 | 3.1 | X | X | Δ |
| Comp. Example 5 | 2.1 | ○ | X | ○ |

Note
* Spherical shape having angular protrusions
 Granular confetto-shape having round protrusions As apparently recognized from the electron micrograph (×50000) shown in FIG. 3, the magnetite particles obtained in Comparative Example 1 had a spherical shape, and were insufficient in effect of preventing desorption of the magnetite particles from the surface of the resin kneaded material particles as compared to the magnetite particles obtained in Example 1. Further, as shown in FIG. 3 and FIG. 4**, the magnetite particles obtained in Comparative Example 1 had a low impedance.

Use Example

| | |
|---|---|
| Styrene-n-butyl acrylate copolymer (copolymerization (comonomer) ratio: 85:15; Mw: 250,000; Tg: 62° C.) | 100 parts by weight |
| Black magnetic iron oxide particles (Example 1) | 80 parts by weight |
| Positive charge controlling agent | 1.5 parts by weight |
| Low-molecular weight ethylene-propylene copolymer | 2 parts by weight |

A mixture of the above raw materials was heated and kneaded using a twin-roll mill maintained at 140° C. for about 15 min, cooled, coarsely pulverized and then finely pulverized. The obtained finely pulverized particles were further classified to remove a fine powder and coarse particles therefrom, thereby obtaining a magnetic toner having a mean volume diameter of 10.4 μm.

A one-component developer prepared from the thus obtained magnetic toner was evaluated for image density and fogging, and then subjected to vibration test using a paint shaker, i.e., durability test, to examine generation of a fine powder of the black magnetic iron oxide particles from the magnetic toner. As a result, it was confirmed that the above magnetic toner was capable of forming images having a high resolution or definition as compared to a one-component developer prepared from a magnetic toner produced using the conventional spherical black magnetic iron oxide particles, and the magnetic toner was substantially free from generation of a fine powder therefrom and had a good durability.

INDUSTRIAL APPLICABILITY

The black magnetic iron oxide particles according to the present invention exhibit a high impedance, and basically have a spherical shape having angular protrusions so that electric charges are readily maintained on the surface of the toner particles, and desorption of the black magnetic iron oxide particles from the surface of the toner particles can be prevented. Also, in the toner obtained from the black magnetic iron oxide particles, the surface area of the magnetic material exposed to the surface of the toner is small, so that charging of the toner is hardly inhibited, resulting in improved charging performance of the toner and formation of toner images having a high image density even under high-temperature and high-humidity conditions. In addition, since the black magnetic iron oxide particles comprise a large amount of Si on the surface thereof, the toner obtained therefrom exhibits a good fluidity and a uniform charging property. Therefore, the black magnetic iron oxide particles of the present invention are suitable as black magnetic iron oxide particles for magnetic toners which are capable of forming toner images having a high resolution or definition when used for developing an electrostatic latent image.

The invention claimed is:

1. Black magnetic iron oxide particles comprising magnetite as a main component and having such a property that when the black magnetic iron oxide particles are molded into a tablet, an electric resistance value of the tablet in an alternating current electric field is controlled to produce an impedance of not less than $2 \times 10^6$ Ωcm as measured in a characteristic frequency range thereof.

2. Black magnetic iron oxide particles according to claim 1, comprising $Fe^{2+}$ in an amount of not less than 17% by weight based on a whole amount of Fe.

3. Black magnetic iron oxide particles according to claim 1, wherein when the black magnetic iron oxide particles are molded into a tablet having a compressed density of 2.3 to 2.9 g/cm$^3$, a characteristic frequency of the tablet as measured in an alternating current electric field is present in a frequency band of not less than 50 Hz and not more than 1500 Hz.

4. Black magnetic iron oxide particles according to claim 1, wherein when the black magnetic iron oxide particles are molded into a tablet having a compressed density of 2.3 to 2.9 g/cm$^3$, a reactance component of the tablet as measured at the characteristic frequency in an alternating current electric field is not less than $3 \times 10^6$ Ωcm.

5. Black magnetic iron oxide particles according to claim 1, wherein when the black magnetic iron oxide particles are molded into a tablet having a compressed density of 2.3 to 2.9 g/cm$^3$, a half band width (as a full width at half maximum) of a peak in a reactance curve owing to a bulk in a frequency-reactance component plotting diagram (Bode diagram) of the tablet in an alternating current electric field is not more than 3 as expressed by logarithm of frequency Hz.

6. Black magnetic iron oxide particles according to claim 1, wherein the black magnetic iron oxide particles have an average particle diameter of 0.05 to 0.50 μm.

7. Black magnetic iron oxide particles according to claim 1, wherein the black magnetic iron oxide particles comprise silicon in an amount of 0.3 to 3.0 atom % in terms of Si based on Fe.

8. Black magnetic iron oxide particles according to claim 1, wherein the black magnetic iron oxide particles basically have a spherical particle shape and are formed with angular protrusions on a surface thereof.

9. Black magnetic iron oxide particles according to claim 8, wherein the number of the protrusions formed on the surface of the respective black magnetic iron oxide particles is in the range of 2 to 30 when viewed on a projected plan thereof.

10. Black magnetic iron oxide particles according to claim 1, wherein the black magnetic iron oxide particles comprise at least one element selected from the group consisting of Al, Ti, Mg, Co, Zr, Mn, Zn, Ni, Cu, S, Na, P, Ca, Ce, Sr, Ba, Cr, Sn and Bi in an amount of 0 to 10.0 atom % based on Fe.

11. A process for producing the black magnetic iron oxide particles as defined in claim 1, comprising the following two-stage reaction steps:

a first-stage reaction step of reacting a ferrous salt aqueous solution with an alkali aqueous solution comprising an alkali in an amount of 0.80 to 0.99 equivalent based on a ferrous salt in the ferrous salt aqueous solution to obtain a ferrous salt reaction aqueous solution comprising a ferrous hydroxide colloid, and then passing an oxygen-containing gas through the ferrous salt reaction aqueous solution while heating the ferrous salt reaction aqueous solution at a temperature of 70 to 100° C. to thereby produce magnetite seed crystal particles; and a second-stage reaction step of adding an alkali aqueous solution in an amount of not less than 1.00 equivalent based on residual $Fe^{2+}$ in the reaction aqueous solution obtained after completion of the first-stage reaction step, and passing an oxygen-containing gas through the resulting solution while heating the solution at a temperature of 70 to 100° C. to subject the magnetite seed crystal particles to growth reaction, wherein in the first-stage reaction step, a water-soluble silicate is added to adjust a pH value of the reaction aqueous solution therein to 7.0 to 8.5, and before initiation of the second-stage reaction step, a ferrous salt solution is added in an amount of 1.0 to 30.0 atom % based on Fe used in the first-stage reaction step.

12. A magnetic toner comprising 100 parts by weight of a binder and 20 to 150 parts by weight of the black magnetic iron oxide particles as defined in claim 1.

* * * * *